(12) United States Patent
Droz et al.

(10) Patent No.: US 11,965,988 B2
(45) Date of Patent: Apr. 23, 2024

(54) MULTIPLEXED MULTICHANNEL PHOTODETECTOR

(71) Applicant: Waymo LLC, Mountain View, CA (US)

(72) Inventors: Pierre-Yves Droz, Mountain View, CA (US); Samuel William Lenius, Sunnyvale, CA (US)

(73) Assignee: Waymo LLC, Mountain View, CA (US)

( * ) Notice: Subject to any disclaimer, the term of this patent is extended or adjusted under 35 U.S.C. 154(b) by 114 days.

(21) Appl. No.: 17/650,342

(22) Filed: Feb. 8, 2022

(65) Prior Publication Data

US 2022/0155425 A1 May 19, 2022

Related U.S. Application Data

(63) Continuation of application No. 17/316,056, filed on May 10, 2021, now Pat. No. 11,269,064, which is a
(Continued)

(51) Int. Cl.
| | |
|---|---|
| *H04N 5/335* | (2011.01) |
| *G01S 7/484* | (2006.01) |
| *G01S 7/4861* | (2020.01) |
| *G01S 7/4865* | (2020.01) |
| *G01S 7/497* | (2006.01) |

(Continued)

(52) U.S. Cl.
CPC ............ *G01S 7/4861* (2013.01); *G01S 7/484* (2013.01); *G01S 7/4865* (2013.01); *G01S 7/497* (2013.01); *G01S 17/10* (2013.01); *G01S 17/42* (2013.01); *H04N 25/40* (2023.01); *H04N 25/77* (2023.01); *H04N 25/772* (2023.01)

(58) Field of Classification Search
CPC ......... H04N 5/335; H04N 5/341; H04N 5/378
See application file for complete search history.

(56) References Cited

U.S. PATENT DOCUMENTS

| | | |
|---|---|---|
| 3,373,441 A | 3/1968 | Zadig |
| 3,661,459 A | 5/1972 | Aoki |

(Continued)

FOREIGN PATENT DOCUMENTS

WO   2006083349 A2   8/2006

*Primary Examiner* — Kevin K Pyo
(74) *Attorney, Agent, or Firm* — McDonnell Boehnen Hulbert & Berghoff LLP

(57) ABSTRACT

A light detection and ranging (LIDAR) system can emit light toward an environment and detect responsively reflected light to determine a distance to one or more points in the environment. The reflected light can be detected by a plurality of plurality of photodiodes that are reverse-biased using a high voltage. Signals from the plurality of reverse-biased photodiodes can be amplified by respective transistors and applied to an analog-to-digital converter (ADC). The signal from a particular photodiode can be applied to the ADC by biasing a respective transistor corresponding to the particular photodiode while not biasing transistors corresponding to other photodiodes. The gain of each photodiode/transistor pair can be controlled by adjusting the bias voltage applied to each photodiode using a digital-to-analog converter. The gain of each photodiode/transistor pair can be controlled based on the detected temperature of each photodiode.

20 Claims, 5 Drawing Sheets

Related U.S. Application Data continuation of application No. 16/262,713, filed on Jan. 30, 2019, now Pat. No. 11,029,396, which is a continuation of application No. 15/947,515, filed on Apr. 6, 2018, now Pat. No. 10,234,546, which is a continuation of application No. 15/357,630, filed on Nov. 21, 2016, now Pat. No. 9,964,632, which is a continuation of application No. 14/669,109, filed on Mar. 26, 2015, now Pat. No. 9,529,079.

(51) Int. Cl.
*G01S 17/10* (2020.01)
*G01S 17/42* (2006.01)
*H04N 25/40* (2023.01)
*H04N 25/77* (2023.01)
*H04N 25/772* (2023.01)

(56) References Cited

U.S. PATENT DOCUMENTS

| | | |
|---|---|---|
| 4,201,442 A | 5/1980 | McMahon et al. |
| 4,516,837 A | 5/1985 | Soref et al. |
| 5,298,905 A | 3/1994 | Dahl |
| 7,969,558 B2 | 6/2011 | Hall |
| 8,183,521 B2 | 5/2012 | Quercia et al. |
| 8,405,029 B2 | 3/2013 | Juntunen et al. |
| 8,675,181 B2 | 3/2014 | Hall |
| 8,767,190 B2 | 7/2014 | Hall |
| 9,069,080 B2 | 6/2015 | Stettner et al. |
| 9,310,197 B2 | 4/2016 | Gogolla et al. |
| 9,450,670 B1 | 9/2016 | Fleischer et al. |
| 9,529,079 B1 | 12/2016 | Droz et al. |
| 10,641,874 B2 | 5/2020 | Campbell et al. |
| 2003/0057533 A1 | 3/2003 | Lemmi et al. |
| 2004/0070748 A1 | 4/2004 | Inaba |
| 2009/0072153 A1 | 3/2009 | Musrock |
| 2010/0259661 A1 | 10/2010 | Tejada et al. |
| 2012/0068050 A1 | 3/2012 | Mazzillo et al. |
| 2013/0222584 A1 | 8/2013 | Aoki et al. |
| 2015/0099309 A1 | 4/2015 | Krufka |
| 2016/0313445 A1 | 10/2016 | Bailey et al. |
| 2017/0242195 A1 | 8/2017 | Lin et al. |
| 2020/0152680 A1* | 5/2020 | Kurokawa ............ H01L 31/032 |
| 2020/0241113 A1 | 7/2020 | Cullumber et al. |

* cited by examiner

MULTIPLEXED MULTICHANNEL PHOTODETECTOR

CROSS-REFERENCE TO RELATED APPLICATIONS

This application is a continuation of U.S. patent application Ser. No. 17/316,056, filed May 10, 2021; which is a continuation of U.S. patent application Ser. No. 16/262,713, filed Jan. 30, 2019 and issued as U.S. Pat. No. 11,029,396 on Jun. 8, 2021; which is a continuation of U.S. patent application Ser. No. 15/947,515, filed Apr. 6, 2018 and issued as U.S. Pat. No. 10,234,546 on Mar. 19, 2019; which is a continuation of U.S. patent application Ser. No. 15/357,630, filed Nov. 21, 2016 and issued as U.S. Pat. No. 9,964,632 on May 8, 2018; which is a continuation of U.S. patent application Ser. No. 14/669,109, filed Mar. 26, 2015 and issued as U.S. Pat. No. 9,529,079 on Dec. 27, 2016. The aforementioned applications are incorporated herein by reference.

BACKGROUND

Unless otherwise indicated herein, the materials described in this section are not prior art to the claims in this application and are not admitted to be prior art by inclusion in this section.

A light detection and ranging (LIDAR) device can detect objects in its environment by transmitting light into the environment and receiving a portion of the transmitted light that has reflected from the objects in the environment back toward the LIDAR device. The received light can be detected by one or more photodetectors. For example, the LIDAR device can include an optical system that focuses the received light onto one or more photodetectors.

SUMMARY

Some embodiments of the present disclosure provide a system including: (i) an analog-to-digital converter; (ii) at least one photodiode biasing voltage source; (iii) a plurality of photodetector channels, wherein each photodetector channel comprises: (a) a photodiode coupled to the at least one photodiode biasing voltage source and configured to provide a photodiode signal indicative of light incident on the photodiode when the photodiode is reverse-biased by the at least one photodiode biasing voltage source; (b) a capacitor coupled to the photodiode; and (c) a transistor that has an input coupled to the photodiode via the capacitor and an output coupled to the analog-to-digital converter and that is configured to amplify the photodiode signal to provide an amplified photodiode signal at the output when the transistor is operationally biased; and (iv) a channel selector that is configured to individually select each respective photodetector channel in the plurality of photodetector channels by operationally biasing the respective transistor in the selected photodetector channel.

Some embodiments of the present disclosure present a method including: (i) selecting, during a first period of time, a first photodetector channel of a system, wherein the system includes: (1) an analog-to-digital converter; (2) at least one photodiode biasing voltage source; (3) a plurality of photodetector channels, wherein each photodetector channel includes: (a) a photodiode coupled to the at least one photodiode biasing voltage source and configured to provide a photodiode signal indicative of light incident on the photodiode when the photodiode is reverse-biased by the at least one photodiode biasing voltage source; (b) a capacitor coupled to the photodiode; and (c) a transistor that has an input coupled to the photodiode via the capacitor and an output coupled to the analog-to-digital converter and that is configured to amplify the photodiode signal to provide an amplified photodiode signal at the output when the transistor is operationally biased; and (d) a channel selector that is configured to individually select each respective photodetector channel in the plurality of photodetector channels by operationally biasing the respective transistor in the selected photodetector channel; wherein selecting the first photodetector channel includes operating the channel selector to operationally bias the respective transistor of the first photodetector channel; (ii) detecting, during the first period of time, light received by the respective photodiode of the first photodetector channel by detecting the output of the respective transistor of the first photodetector channel using the analog-to-digital converter; (iii) selecting, during a second period of time, a second photodetector channel of the system, wherein selecting the second photodetector channel comprises operating the channel selector to operationally bias the respective transistor of the second photodetector channel; and (iv) detecting, during the second period of time, light received by the respective photodiode of the second photodetector channel by detecting the output of the respective transistor of the second photodetector channel using the analog-to-digital converter.

These as well as other aspects, advantages, and alternatives, will become apparent to those of ordinary skill in the art by reading the following detailed description, with reference where appropriate to the accompanying drawings.

DETAILED DESCRIPTION

Figure 1A:
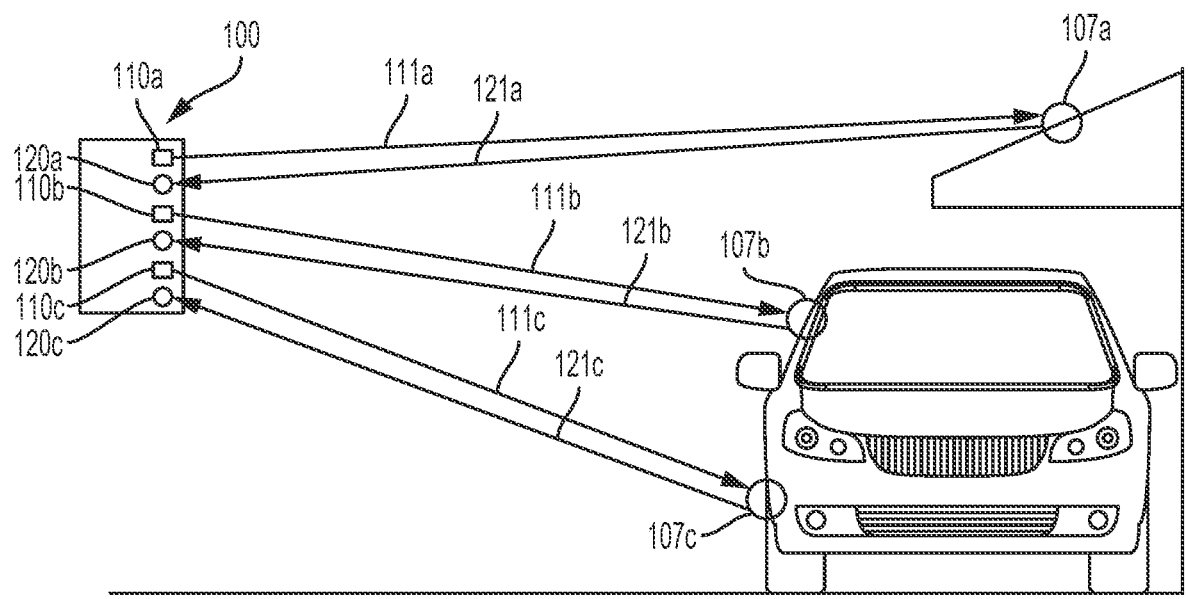
FIG. 1A illustrates an example LIDAR system in an example environment.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

I. Overview

A light detection and ranging (LIDAR) system determines the distance to one or more points or objects in an environment by emitting pulses of lights to illuminate the one or more points or objects and detecting light responsively emitted from (e.g., reflected from) the one or more points or objects. The LIDAR system can then determine the distance to the one or more points or objects by determining an amount of time (e.g., a 'time-of-flight') between emission of a pulse of illumination and the reception of a corresponding pulse or other feature of detected responsively emitted (e.g., reflected) light. Such distance information can be used to map the environment, to determine the locations, sizes, geometries, velocities, or other information about objects in the environment, or to determine some other information about the environment of the LIDAR system. In some examples, information about an environment determined by a LIDAR system could be used to control an autonomous vehicle (e.g., a driverless car) such that the autonomous vehicle can navigate the environment to reach a destination while avoiding obstacles.

The LIDAR system could include more than one light emitter and/or more than one photodetector. The light emitters/photodetectors could be configured to illuminate/receive light from one or more specified directions relative to the LIDAR system. The specified directions could span a range of directions (e.g., be regularly spaced across a range of angles in one or more directions) such that the distance from the LIDAR system to the environment (e.g., to objects in the environment) across the range of directions could be mapped. This could allow the determination of the shape of the environment and/or the shape of objects in the environment. In some examples, the light emitters and/or photodetectors could be actuated such that the direction toward which light is emitted/from which light is received can be controlled. In such examples, the specified direction could be scanned across a range of angles.

A single light emitter could provide light to illuminate a variety of points or objects in an environment such that more than one photodetector could receive responsively emitted (e.g., reflected) light. In some embodiments, a LIDAR system could include a plurality of light emitters each corresponding to a respective photodetector such that a particular light emitter emits light in a direction from which the corresponding photodetector receives light. In some examples, the LIDAR system could include optics, e.g., configured to focus a beam of light emitted toward the environment in a specified direction and/or to focus light received from the environment from a particular direction onto a light-sensitive element of a photodetector.

Photodetectors of a LIDAR system could include a variety of components configured in a variety of ways. In some examples, a photodetector could include a reverse-biased photodiode. When a photodiode is reverse-biased, the current through the photodiode can be related to the intensity of the light received by the photodiode. In such examples, the reverse bias voltage could be sufficiently high (e.g., less than approximately 340 volts, in some examples between approximately 100 volts and approximately 250 volts) that the photodetector operates in an avalanche mode, i.e., electrons in the photodiode generated by received photons could be multiplied through avalanche multiplication due to the high electrical field in the photodiode. In some examples, the photodiode could be an avalanche photodiode configured to increase this multiplication effect (e.g., by being doped and/or beveled in such a way to increase the amount of avalanche multiplication). The current through the photodiode could be amplified, switched, multiplexed, or otherwise applied to an analog-to-digital converter (e.g., a comparator, a sigma-delta modulator) to allow a digital controller or other digital computing elements to perform some operations based on the received detected light (e.g., to determine a distance between the LIDAR system and objects in the environment).

In some examples, each photodetector and/or photodiode could correspond to a respective ADC or other components. Alternatively, the outputs of a plurality of photodiodes could be applied to a single ADC (e.g., too reduce a cost, a power consumption, a size, or to affect some other property of the LIDAR system). In some examples, each photodetector could comprise a photodetector channel that includes a photodiode, coupling capacitor, amplifying/multiplexing transistor, transistor and/or photodiode biasing components, and/or other components. In such examples, the outputs of each of a plurality of such photodetector channels could be applied to a single ADC. Applying the outputs of a plurality of photodiodes, photodetectors, and/or photodetector channels to a single ADC could include using a multiplexer to sequentially apply a signal (e.g., a signal related to the current through the photodiodes) from each photodiode in turn to the single ADC (i.e., to sequentially select each photodiode in turn). Such a multiplexer could include a number of electronic switches, amplifiers, buffers, blocking capacitors or other passive filtering elements, or other components. Such a multiplexer could be configured to reduce cross-talk between different photodiodes, i.e., to reduce an amount of signal applied to the ADC from non-selected photodiodes.

In a particular example, a multiplexer could include a plurality of transistors (e.g., silicon-germanium (SiGe) bipolar transistors) each included as part of a respective photodetector channel that additionally includes a respective reverse-biased photodiode. An output of each photodiode (e.g., the anode of the diode) could be coupled (e.g., via a capacitor) to the input of the corresponding transistor (e.g., to the base of a bipolar transistor). An output (e.g., the collector) of the transistors could be coupled to an ADC (e.g., a high-frequency ADC, a comparator). The transistors could be configured to amplify respective photodiode output signals when operationally biased (e.g., when operationally biased by applying a biasing voltage and/or current to/through a base or gate of the transistors). A channel selector could be configured to individually select each transistor (e.g., to select respective photodetector channels including each transistor) by operationally biasing each transistor individually (i.e., during each point in time, operationally biasing a single transistor of a plurality of transistors while not operationally biasing other transistors of the plurality of transistors).

The channel selector could operate to operationally bias a transistor by applying a voltage and/or current to the transistor, e.g., by applying a specified bias current through the base of a bipolar transistor by applying a specified bias voltage to a bias resistor coupled to the base of the bipolar transistor. The channel selector could include a CMOS gate or other type of electronic switch to connect the transistor (e.g., the base of a bipolar transistor) via a bias resistor or other component(s) to a source of the specified voltage to operationally bias the transistor and to connect the transistor to a ground or other lower-voltage source to not operationally bias the transistor. Further, a Schottky diode or other voltage-clamping element could be included to prevent an input to the transistor (e.g., from the photodiode) from causing the transistor to saturate (e.g., by preventing the voltage and/or current applied to the transistor by the photodiode from increasing above the specified bias voltage/current by more than a specified amount).

A gain of a photodiode, a transistor, and/or a photodetector channel (e.g., a combination of a photodiode, a transistor, and/or other electronic components of a LIDAR system) could be controlled according to an application by controlling bias voltages and/or currents applied to the photodiode, transistor, and/or one or more components of the photodetector channel. For example, an amount of voltage applied to a photodiode could be adjusted to control an overall gain of a photodetector channel that includes the photodiode and a transistor that can be operationally biased by a channel selector as described above. This could include controlling a high voltage used to reverse-bias a number of photodiodes in common (e.g., a high-voltage rail of the LIDAR system). Additionally or alternatively, each photodiode (or other component to be biased) could have a bias voltage that is individually controllable, e.g., the LIDAR system could include a digital-to-analog converter (DAC) for each of the photodiodes that is configured to provide an independently adjustable bias voltage to each photodiode.

The gain of a photodiode and/or the overall gain of a photodetector channel (e.g., a photodetector channel that includes a transistor and a photodiode, as described elsewhere herein) can be related to the temperature of the photodiode and/or a photodiode of the photodetector channel. A relationship between the temperature of a photodiode, a reverse bias voltage applied to the photodiode, and the gain (i.e., the relationship between the intensity of light received by the photodiode and the magnitude of an output signal of the photodiode) of the photodiode could be determined and used to adjust the bias voltage and/or temperature of the photodiode such that the gain of the photodiode is controlled (e.g., such that the gain of the photodiode has a specified value). In some examples, the temperature of the photodiode could be detected and the bias voltage applied to the photodiode could be controlled based on the detected temperature such that the photodiode gain has a specified value.

Other components could be included to couple a photodiode to a transistor or other elements, to bias the photodiode, and/to prevent the photodiode from being damaged during operation. For example, a capacitor could be used to couple the anode or cathode of the photodiode to a transistor (or other component). The capacitance could block a high-voltage DC bias applied to the photodiode from being applied to the transistors. A capacitance or some other property of the capacitor could be specified such that a total current passing through the photodiode as a result of receiving a pulse of light is limited. Additionally or alternatively, a resistor having a specified resistance could be coupled between the photodetector and a source of a bias voltage such that a total current passing through the photodiode as a result of receiving a pulse of light is limited. In a particular example, a photodiode could be coupled to a source of bias voltage via an approximately 300 kΩ resistor and coupled to a transistor via an approximately 47 picofarad capacitor. Such passive components (e.g., resistors, capacitors) could be configured to decouple certain components and/or signals, e.g., to decouple noise generated by a DAC of a bias voltage source from a transistor or other component receiving a signal from the photodiode.

Note that multiplexers, photodiodes, bias voltage sources, transistors, channel selectors, and/or other components or systems as described herein are not limited to use in a LIDAR system. Embodiments described herein could be applied to a variety of systems of devices wherein a plurality of photodiodes or other sensor components or other signal sources are multiplexed to provide an output to a single component (e.g., a single ADC). For example, a plurality of photodetectors could be used to detect light emitted from a biological sample in response to illumination (e.g., to detect emission of light by fluorophores in a variety of non-overlapping regions of a sample environment). In another example, a plurality of photodetectors could be used for coincidence detection between a number of optical signals. Other applications are anticipated.

It should be understood that the above embodiments, and other embodiments described herein, are provided for explanatory purposes, and are not intended to be limiting.

II. Example Multiplexed Photodetectors

FIG. 1A shows an example LIDAR system 100 situated in an environment that includes a number of objects (e.g., an automobile, an overhang). The LIDAR system is configured to emit a plurality of beams of light into the environment and to receive reflected or otherwise responsively emitted light from the environment to determine the distance between the LIDAR system 100 and objects in the environment. The LIDAR system 100 includes three light emitters 110*a-c* configured to emit respective beams of emitted light 111*a-c* in respective directions. As shown in FIG. 1A, the beams of emitted light 111*a-c* illuminate respective portions of the environment 107*a-c*. The portions of the environment 107*a-c* responsively reflect (or otherwise emit) light and a portion of the responsively emitted light comprises respective reflected lights 121*a-c* that are received by respective photodetectors 120*a-c* of the LIDAR system 100.

The light emitters 110*a-c* and/or photodetectors 120*a-c* could include optics (e.g., lenses, mirrors, diffraction gratings) configured to emit light toward/receive light from a specific direction and/or to focus such light, to filter out one or more wavelengths, bands of wavelengths, polarizations, or other specified properties of such light, or to otherwise interact with or modify such light. For example, optics of the LIDAR system 100 could be configured to focus and/or collimate light produced by one or more light emitters (e.g., 110*a-c*) into one or more respective beams of light directed in respective directions toward the environment of the LIDAR system 100. The optics could additionally be configured to focus light responsively emitted from (e.g., reflected from) respective regions of the environment located in respective directions from the LIDAR system 100 (e.g., the directions toward which the light emitters emitted beams of light) onto respective photodetectors (e.g., 120*a-c*) of the LIDAR system 100. The optics could additionally be configured to filter wavelengths of the received light such that photodetectors of the LIDAR system 100 substantially only received light corresponding to the wavelength of light emitted by the light emitters of the LIDAR system 100 (e.g., such that the photodetectors substantially only receive the emitted light that is reflected from objects or portions of the environment).

The light emitters include lasers, LEDs, or other light-emitting elements. The light emitting-elements could be configured to emit substantially monochromatic light (e.g., light having substantially a single wavelength) and/or could emit light having some other specified spectral content (e.g., to allow the detection of a color or other spectrographic information about objects or regions in the environment). The light emitters could be configured to emit light at the same time or during different periods of time. The light emitters could be configured to emit pulses of light, to emit light continuously, to emit light having an oscillating or otherwise time-varying intensity, or according to some other pattern or consideration. The light emitters could emit lights having different wavelengths (or polarizations, directions of polarization, or some other property) such that corresponding wavelength-selective filters of corresponding photodetectors could substantially only receive light from respective light-emitters.

One or more properties of the received reflected lights 121a-c (e.g., a timing, amplitude, width, or other properties of a pulse of light in the received reflected lights 121a-c corresponding to a pulse of illumination in respective emitted lights 111a-c) could be used to determine the distance between the LIDAR system 100 and objects in the environment in directions corresponding to the directions of the emitted lights 111a-c (e.g., the distance to objects comprising the portions of the environment 107a-c). A difference between the timing of an emitted pulse of illumination and the timing of a corresponding pulse of received, responsively emitted (e.g., reflected) light could be used to determine a distance between a LIDAR system that includes the light emitter and the photodetector (e.g., using a known speed of light in the environment).

Figure 1B:
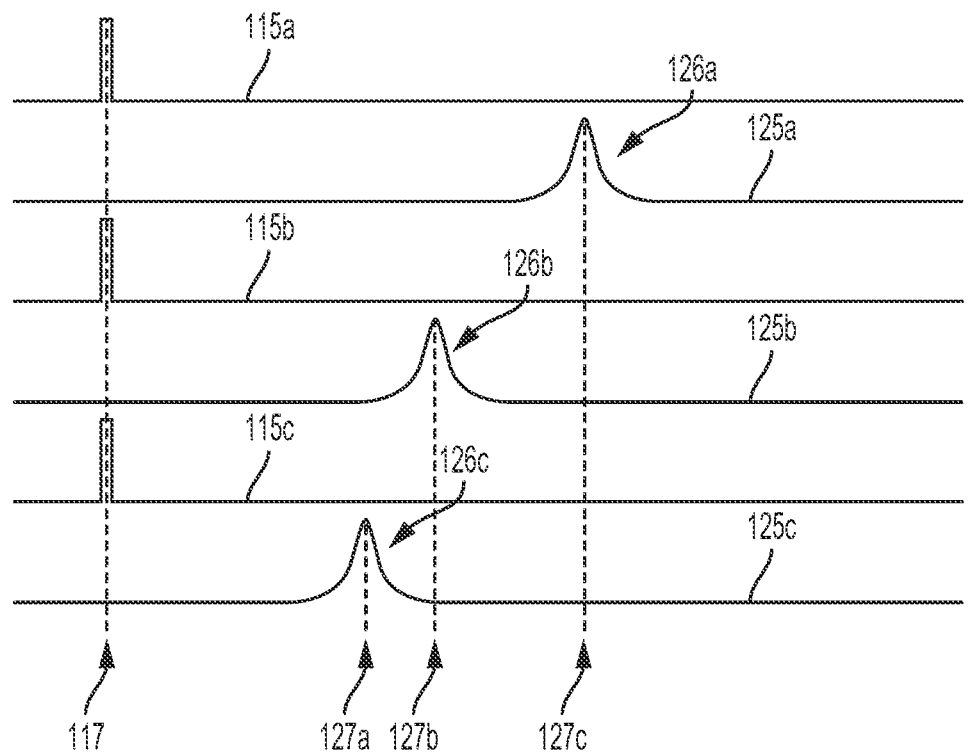
FIG. 1B illustrates example waveforms of emitted illumination and received reflected light signals of the LIDAR system of FIG. 1A.

As an example, FIG. 1B shows a timing diagram of pulses of illumination of the emitted lights 111a-c and respective received reflected lights 121a-c. Illumination waveforms 115a-c represent the intensity of respective beams of emitted light 111a-c emitted by respective light emitters 110a-c. Detector waveforms 125a-c represent the intensity of respective reflected lights 121a-c received by respective photodetectors 120a-c. As shown in FIG. 1B, the light emitters 110a-c emit respective pulses of light (shown in the Figure as square pulses) at substantially the same point in time (indicated by the dashed line, showing illumination time 117). Detector waveforms 125a-c include respective detected pulses 126a-c corresponding to light emitted from respective light emitters 110a-c during the illumination time 117 and reflected from portions of the environment 107a-c. Detection times 127a-c can be determined from the detected pulses 126a-c (e.g., by determining a peak amplitude, by determining a centroid, by determining a mean time between threshold crossings, or by using some other method). The determined detection times 127a-c can then be used to determine distances to respective portions of the environment 107a-c based on time differences between the illumination time 117 and respective detection times 127a-c.

In some examples, the intensity or some other detected property of light received by a plurality of photodetectors (e.g., 120a-c) could be multiplexed or otherwise combined and applied to a single analog-to-digital converter (ADC) or some other electronic device or component. For example, an ADC capable of sampling at a sufficiently high rate and/or having a sufficiently high bandwidth for an application (e.g., to provide samples of the received light intensity at a sufficiently high temporal resolution to provide for determination of distances to portions of the environment at a sufficiently high spatial resolution/sensitivity) could have a size, a power requirement, a mass, a data bus width and/or output bandwidth, a cost, or some other property such that a LIDAR system could include a single such ADC. In such an example, light received from the environment (e.g., light emitted by a LIDAR system and reflected from objects or regions of an environment) could be detected by a plurality of photodetectors (e.g., by a plurality of photodiodes) and a signal from each of the photodetectors (e.g., an electronic output related to the intensity of light received by the individual photodetectors) could be applied, during respective different periods of time (e.g., sequentially), to a single ADC.

Figure 2:
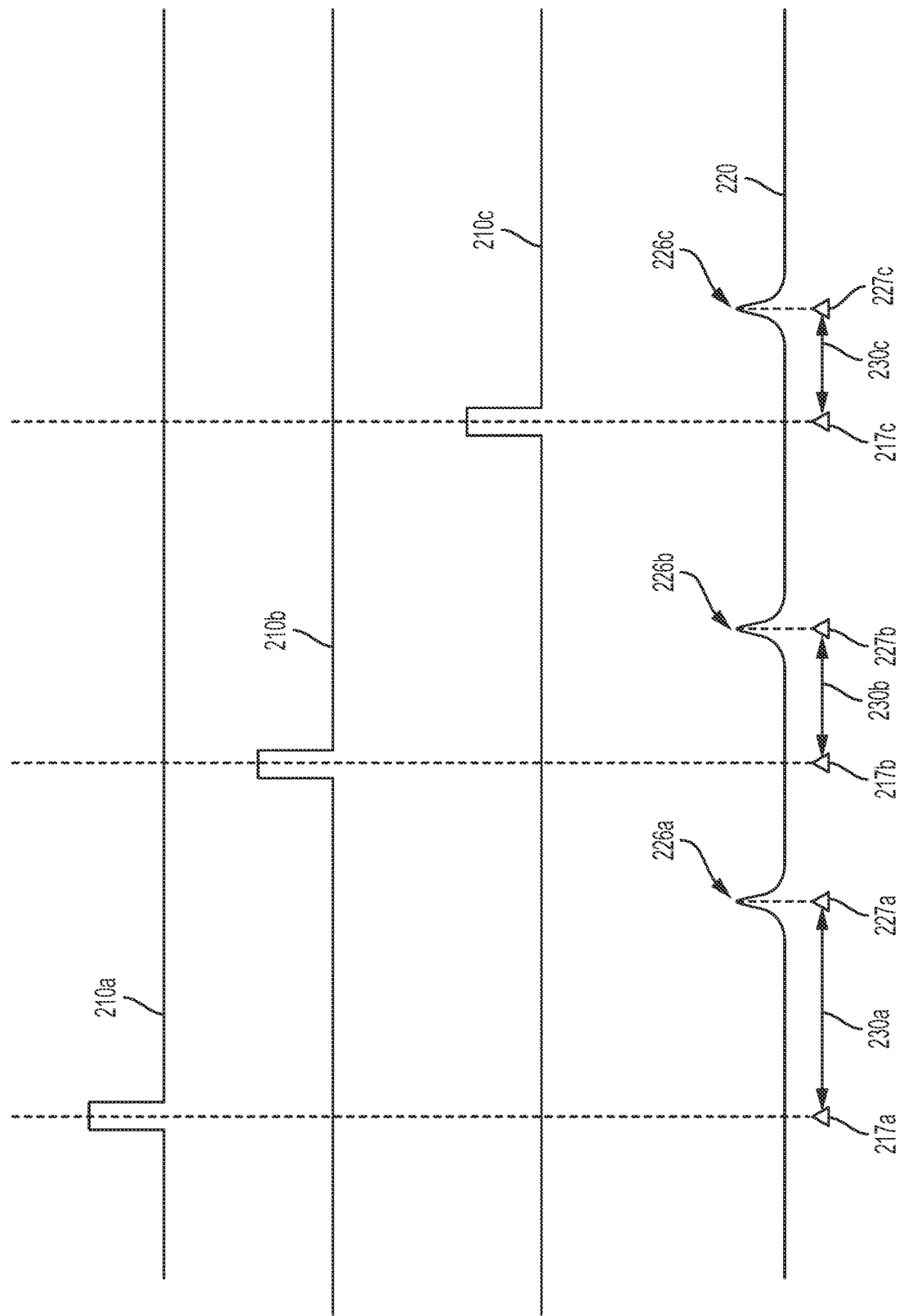
FIG. 2 illustrates example waveforms of emitted illumination and received reflected light signals of an example LIDAR system.

As an illustrative example, FIG. 2 shows a timing diagram of pulses of illumination of the emitted lights 111a-c and a multiplexed combination of respective received reflected lights 121a-c. Illumination waveforms 210a-c represent the intensity of respective beams of emitted light 111a-c emitted by respective light emitters 110a-c. Detector waveform 220 represents the intensity of respective reflected lights 121a-c received by respective photodetectors 120a-c and multiplexed in time to a single signal (e.g., a signal applied to an ADC). As shown in FIG. 2, the light emitters 110a-c emit respective pulses of light (shown in the Figure as square pulses) at respective different points in time (indicated by the dashed lines and triangles, showing respective illumination times 217a-c). The detector waveform 220 shows the time-domain-multiplexed combination of the outputs of the photodetectors 120a-c; that is, during different respective periods of time the detector waveform 220 reflects the detected intensity (or other output signal) of respective different photodetectors 120a-c. As shown in FIG. 2, between the first 217a and second 217b illumination times the detector waveform 220 represents the output of the first photodetector 120a, between the second 217b and third 217c illumination times the detector waveform 220 represents the output of the second photodetector 120b, and the detector waveform 220 represents the output of the third photodetector 120c for a period of time subsequent to the third illumination time 217c.

The detector waveform 220 includes detected pulses 226a-c corresponding to light emitted from respective light emitters 110a-c during respective illumination times 217a-c and reflected from portions of the environment 107a-c. Detection times 227a-c can be determined from the detected pulses 226a-c (e.g., by determining a peak amplitude, by determining a centroid, by determining a mean time between threshold crossings, or by using some other method). The determined detection times 227a-c can then be used to determine distances to respective portions of the environment 107a-c based on respective determined time differences 230a-c between respective illumination times 217a-c and respective detection times 227a-c. That is, longer determined time differences could be related to light reflected from objects or portions of the environment that are more distant from the LIDAR system 100.

The duration of periods of time during which the detector waveform 220 is related to the output of each photodetector could be specified to allow a rate of illuminating and detecting responsively reflected received light from a plurality of photodetectors/light emitters. This rate, duration, and/or switching time could be related to a number of light/emitter photodetector pairs included in the LIDAR system and a frequency at which the distance between the LIDAR system and the environment is detected/updated. Further, the photodetectors 120a-c and light emitters 110a-c could be actuated to receive light from/emit light toward the environment in different directions during different periods of time (e.g., the light emitters 110a-c and photodetectors 120a-c could be actuated to rotate about an axis such that the directions of emission/reception rotate to scan the environment around the LIDAR system 100). In such examples, shorter time periods during which each photodetector output is applied to the ADC or other multiplexed output could allow higher rates of distance detection (e.g., by allowing the plurality of photodetector outputs to be scanned in a shorter period of time) and/or some other increased rate, decreased latency, or other improved property of the LIDAR system.

In some examples, periods of time during which the detector waveform 220 is related to the output of each photodetector could be separated by switching times related to the operation of a channel selector or other components to operationally bias respective transistors of the photodetector channels. Such a switching time could be related to a settling time or other properties of transistors of the photodetector channels (e.g., a time following the application of a biasing current and/or voltage to the transistors during which the output of the transistor is changing or otherwise not indicative of the current through and/or light received by a respective photodiode of a photodetector channel). Such a switching time could additionally or alternatively be related to a value of an applied biasing voltage or current, an effective capacitance and/or impedance of the transistors, an effective capacitance and/or impedance of electronic switches or other components of a channel selector that are used to apply the biasing voltages and/or currents to operationally bias the transistors. In some examples, such switching times could be minimized, e.g., to maximize an amount of time during which a LIDAR system (e.g., 100) could operate to detect (e.g., using an ADC) intensities or other properties of light received by photodetectors of the LIDAR system. For example, a LIDAR system (e.g., transistors of photodetector channels thereof, components of channel selectors thereof) could be configured and/or operated such that such switching times have durations that are less than approximately 100 nanoseconds.

Electronics of a LIDAR system (e.g., photodetectors, multiplexers, ADCs, amplifiers, filters, light emitters, light emitter drivers, pulse generators, power supplies, timers, oscillators, clocks) could be configured in a variety of ways to allow a plurality of pulses (or other waveforms) of light to be emitted toward an environment from the LIDAR system in a plurality of directions and to detect properties (e.g., intensity waveforms, pulse timings) of responsively emitted (e.g., reflected) light received from the environment from corresponding directions. In some examples, this could include the LIDAR system having a plurality of ADCs or other components configured to receive outputs from respective single photodetectors (i.e., the LIDAR could include as many ADCs as photodetectors). Alternatively, the output of a plurality of photodetectors of a LIDAR system could be multiplexed and applied to a single such ADC.

Figure 3:
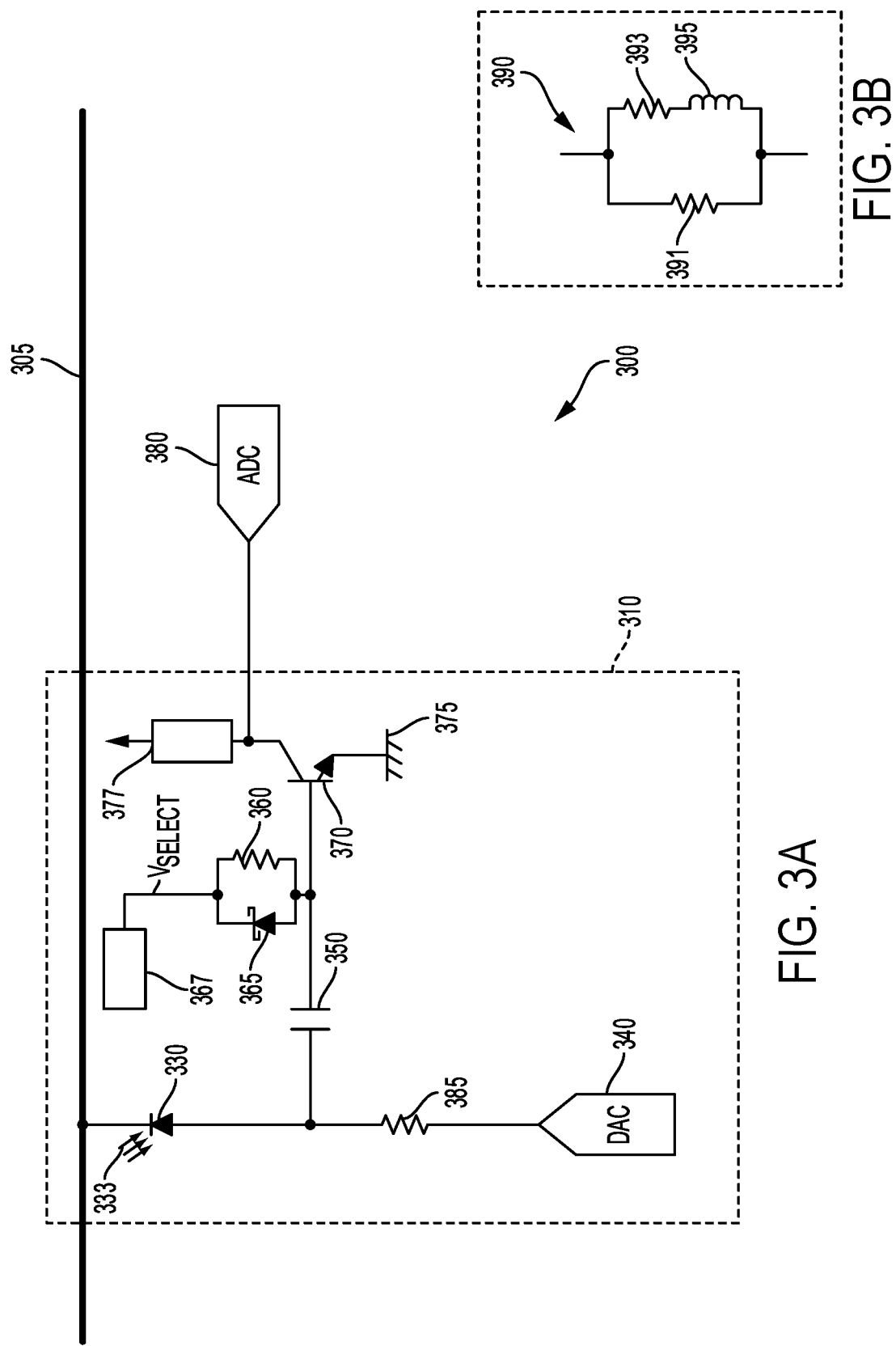
FIG. 3A illustrates example components of a multichannel photodetector system.
FIG. 3B illustrates example components of a specified impedance.

FIG. 3 illustrates electronic circuitry of a LIDAR system 300 wherein the outputs of a plurality of photodetector channels (components of a particular photodetector channel indicated by components within the dashed box 310, components common to the plurality of photodetector channels outside the dashed box) can be applied to a single ADC 380. A particular photodetector channel 310 includes a photodiode 330 configured to receive responsively emitted (e.g., reflected) light 333 and to be operated (e.g., reverse biased) such that an electrical signal of the photodiode (e.g., a current through the photodiode) is related to an intensity of the received light 333. The cathode of the photodiode 330 is coupled to a photodiode voltage biasing source 305 in common with the cathodes of photodiodes of other photodiode channels. The anode of the photodiode 330 is coupled to a digital-to-analog converter (DAC) 340 via a resistor 385.

The anode of the photodiode 330 is also coupled to the input (e.g., base) of a transistor 370 (e.g., a bipolar transistor) via a capacitor 350. The base of the bipolar transistor 370 is also coupled to a voltage $V_{SELECT}$ provided by a channel selector 367 that can be controlled to operationally bias the transistor 370 (e.g., during one or more specified periods of time). The input of the transistor 370 is coupled to $V_{SELECT}$ via a resistor 360 and a Schottky diode 365. An output (e.g., collector) of the transistor 370 is connected in common with the outputs of transistors of other photodiode channels to the ADC 380. The transistor 370 is also coupled to an electrical ground 375 of the LIDAR and to a transistor voltage source via a specified impedance 377. The transistor 370 and components coupled thereto are configured such that the transistor 370, when operationally biased, amplifies the photodiode signal (i.e., the current signal through the photodiode 330 that is related to the intensity of the received light 333) applied to the transistor input and provides the amplified output signal to the ADC 380.

The photodiode voltage biasing source 305 and DAC 340 operate to apply a voltage to reverse-bias the photodiode 330 such that the photodiode 330 provides a photodiode signal (e.g., a current through the photodiode, a voltage coupled to the transistor 370 through the capacitor 350) indicative of the received light 333 incident on the photodiode 330 (e.g., indicative of the intensity of the received light 333). A gain of the photodiode 330, i.e., a relationship between an amplitude of the produced photodiode signal (e.g., a magnitude of a produced voltage signal) and the received light 333 (e.g., an intensity of the received light 333) could be related to the magnitude of the reverse-biasing voltage applied to the photodiode 330, a resistance of the resistor 385, or some other factors. An increase in the magnitude of the applied reverse-bias voltage (e.g., by increasing the voltage provided by the photodiode voltage biasing source 305 and/or by decreasing the voltage provided by the DAC 340) could increase the gain of the photodiode 330. In some examples, the voltage provided by the (at least one) photodiode voltage biasing source 305 could be controllable. Note that the photodiode voltage biasing source 305 is applied in common to a plurality of photodiode channels (including, e.g., 310); however, a plurality of photodiode voltage biasing sources could be included to provide respective biasing voltages to respective photodiodes (e.g., 330) and/or to respective groups of photodiodes in common.

In some examples, the applied reverse-bias voltage could be sufficiently high that the photodiode 330 operates in an avalanche mode, i.e., electrons in the photodiode generated by received photons could be multiplied through avalanche multiplication due to the high electrical field in the photodiode. This could include the applied reverse-bias voltage being a high voltage, e.g., a voltage between approximately 150 volts and approximately 250 volts. In some examples, the photodiode could be an avalanche photodiode configured to increase this multiplication effect (e.g., by being doped and/or beveled in such a way to increase the amount of avalanche multiplication).

A channel selector (e.g., 367) is configured to individually select each photodetector channel (e.g., 310) of the plurality of photodetector channels of the LIDAR system 300 individually by operationally biasing (e.g., providing a biasing current and/or voltage via respective $V_{SELECT}$ voltage sources of respective photodetector channels) respective transistors (e.g., 370) of the photodetector channels. This could include providing a single biasing voltage to each of the transistors (e.g., approximately 1 volt) applied to respective biasing resistors (e.g., approximately 5 kΩ resistors, e.g., 360). Additionally or alternatively, the channel selector (e.g., 367) could provide a different voltage to each of the transistors to operationally bias the transistors (e.g., a different voltage for each of the transistors specified to control the overall gain of each of the photodetector channels). In some examples, the biasing voltage is specified to provide a specified biasing current (e.g., such that a biasing current of approximately 50 microamps passes through the base of the transistors). In some examples, the channel selector (e.g., 367) could, during some periods of time, operationally bias no transistors. In some examples, the channel selector (e.g., 367) could operate to operationally bias multiple transistors simultaneously. In some examples, the transistor 370 and other components could be configured such that a switching time between a first period of time during which a first particular transistor (e.g., 370) is operationally biased by the channel selector (e.g., 367) and a second period of time during which a second particular transistor is operationally biased by the channel selector (e.g., 367) is less than approximately 100 nanoseconds.

The output of a selected individual transistor could be detected by the ADC 380 to generate a variety of digital outputs in a variety of ways. In some examples, the ADC 380 could include one or more comparators configured to output a digital signal when the signal received from the selected transistor exceeds some specified voltage(s). In some examples, the ADC could be configured or operated to generate a digital representation (e.g., a number of bits representing numeric value) of the voltage and/or current of the signal received from the selected transistor at one or more points in time (e.g., at a plurality of points in time at a specified sample rate). In some examples, the ADC 380 could be configured to produce a number of such digital representations (i.e., samples) in response to some signal (e.g., in a triggered mode) and or during a specified period of time (e.g., during a period of time during which it is expected that a pulse of increased intensity will occur in the received light 333). Other modes of operation and outputs of the ADC 380 are anticipated. The outputs of the ADC 380 could be used for a variety of applications including determining a distance to an object or portion of the environment from which the received light 333 was received based on a time difference between the timing of a pulse of increased intensity in the received light 333 and the timing of emission of a pulse of illumination (e.g., by a laser of the LIDAR system 300) to illuminate the environment such that the received light 333 is responsive emitted (e.g., reflected).

The photodiode 330 could be configured in a variety of ways. The photodiode 330 could include silicon, germanium, indium gallium arsenide, lead sulfide, mercury cadmium telluride, or some other light-sensitive semiconductor material. The composition, doping, or other characteristics of the photodiode 330 could be specified to control the spectral sensitivity of the photodiode 330. For example, the photodiode 330 could be configured to be sensitive to a wavelength of light emitted by a light emitter of the LIDAR system 300. Additionally or alternatively, the photodetector 330 and/or the LIDAR system 300 could include an optical filter or other elements such that the photodiode signal produced by the photodiode 330 is substantially unrelated to wavelengths of light other than a wavelength of light emitted by a light emitter of the LIDAR system 300 (i.e., an optical filter of the photodiode 330 could substantially block light of wavelengths other that the wavelength of the emitted light). An area of a light-sensitive region of the photodiode 330 or other characteristics of the photodiode 330 could be specified to control a sensitivity, a gain, a breakdown voltage, a gain as a function of applied reverse bias voltage, or other properties of the photodiode 330.

A resistance of the resistor 385, the capacitance of the capacitor 350, and/or properties of additional or alternative components used to couple the photodiode 330 to source(s) of biasing voltage and/or to some other components (e.g., an amplifier, a transistor, an ADC, a multiplexer, an electronic switch) could be specified according to a variety of applications. In some examples, the resistor 385 and/or capacitor 350 could be specified to limit a current through the photodiode 330 when the photodiode receives a pulse of illumination (e.g., by the intensity of the received light 333 increases) such that the photodiode signal is limited and/or such that the photodiode 330 is not damaged by such operation. In some examples, the resistor 385 and/or capacitor 350 could be specified to provide some analog filtering, e.g., to prevent switching noise or other signals produced by the DAC 340 and/or photodiode voltage biasing source 305 from being coupled to the transistor 370. For example, the resistor 385 could be approximately 300 kΩ and the capacitor 350 could be approximately 45 nanofarads.

The DAC (e.g., 340) of each photodetector channel (e.g., 310) could be configured to adjust a reverse-bias voltage applied to a respective photodiode (e.g., 330) of the photodiode channel. In some examples, the reverse-bias voltages applied to photodetectors of the LIDAR system 300 could be controlled by controlling the voltage provided by the photodiode voltage biasing source 305. The voltage applied to a particular photodiode (e.g., 330) could be adjusted by controlling a respective DAC (e.g., 340). In such examples, the DACs (e.g., 340) provided to adjust the reverse bias voltage of individual photodiodes (e.g., 330) could be configured to provide voltages across a specified range of voltages, e.g., the DACs could be configured to adjust reverse-bias voltages applied to respective photodiodes by at least approximately 50 volts.

The reverse-bias voltage applied to the photodiodes could be adjusted to control a gain of the photodiodes, e.g., to control a gain of a photodiode to prevent saturation of an amplifier, to maintain a magnitude of an output of a photodiode and/or photodetector channel within some specified limits of an ADC or other component, to compensate for changes in the gain of the photodiode that are related to changes in temperature, or according to some other consideration. In a particular example, calibration data (e.g., information describing curves, surfaces, functions, or other algorithms for predicting the gain of a photodiode and/or the overall gain of a photodetector channel as a function of temperature, applied reverse-bias voltage, and/or some other factors) for the photodetector channel 310 gain relative to the reverse-bias voltage provided to the photodiode 330 and further relative to the temperature of the photodiode 330 could be determined (e.g., by empirical testing of the gain of the photodetector channel 310 at a variety of photodiode temperatures and applied reverse-bias voltages). When operating the photodetector channel 310, the temperature of the photodiode 330 and/or of the photodetector channel 310 could be detected (e.g., using a temperature sensor of the LIDAR system 300 that is configured to detect the temperature of the photodiode 330 and/or other components of the LIDAR system 300 (e.g., other photodiodes)) and the reverse-bias voltage applied to the photodiode could be adjusted based on the detected temperature and the determined calibration data (e.g., to maintain the gain of the photodetector channel 310 at a specified level by, e.g., operating the DAC 340 and/or photodiode voltage biasing source 305 to adjust a reverse-bias voltage applied to the photodiode 330).

Note that the configuration (e.g., topology) of the photodiode-biasing elements of the photodetector channel 310 is intended as a non-limiting example. As shown in FIG. 3A, the photodetector signal (i.e., a voltage or current related to the light received by the photodiode 330) could be coupled from the cathode of the photodiode 330 additionally or alternatively to being coupled to the anode, as shown. This could include a resistor and/or capacitor being included to couple the cathode to the transistor 370 (and/or some other component configured to receive a photodiode signal) and/or to couple the cathode of the photodiode 330 to a source of reverse-bias voltage.

Note that the transistor 370 being illustrated as a bipolar transistor in FIG. 3A is intended as a non-limiting example. The transistor 370 could be a field-effect transistor, a junction gate field effect transistor, a metal-oxide-semiconductor field effect transistor. The type and properties of the transistor 370 (e.g., a composition of the transistor, a gain of the transistor, a bandwidth of the transistor, a gain-bandwidth product of the transistor) could be specified according to an application; for example, the transistor 370 could be a silicon-germanium (i.e., SiGe) bipolar transistor. The transistor could have a high bandwidth, e.g., a bandwidth greater than approximately 42 gigahertz. The polarity of the transistor 370 being NPN is intended as a non-limiting example; the transistor 370 could alternatively be a PNP transistor. Further, the configuration (e.g., topology) of the transistor-biasing and/or transistor-gain-setting elements of the photodetector channel 310 is intended as a non-limiting example. For example, an output signal of the transistor 370 could additionally or alternatively be coupled from the emitter of the transistor 370 (e.g., an additional or alternative specified impedance could be included to couple the emitter of the transistor 370 to a ground or to some other voltage source and the output signal of the transistor 370 could be coupled from the emitter). Further, each photodetector channel could include more than one transistor.

The base resistor 360 could be specified relative to a voltage provided by $V_{SELECT}$ when operationally biasing the transistor 370, properties of the transistor 370, a voltage provided by the transistor voltage source (e.g., approximately 4 volts), properties of the specified impedance 377, and/or other factors to set a gain of the transistor 370, to prevent saturation of the transistor 370 when operationally biased, or according to some other consideration. Further, the Schottky diode 365 is provided to prevent a voltage applied to the input of the transistor 370 (e.g., a voltage related to one or more pulses of light received by the photodiode 330) from causing the transistor 370 to become saturated. For example, the Schottky diode 365 could be configured to prevent the voltage applied to the input of the transistor 370 from increasing above a voltage provided by $V_{SELECT}$ by more than a specified amount (i.e., the Schottky diode 365 could be configured to clamp the voltage applied to the input of the transistor 370). This could include the Schottky diode 365 having a forward voltage drop of approximately 400 millivolts.

A channel selector (e.g., 367) could operationally bias (i.e., provide biasing voltage(s) e.g., via $V_{SELECT}$) transistors (e.g., 370) of photodetector channels (e.g., 310) of the LIDAR system in a variety of ways. In some examples, the channel selector (e.g., 367) could include an electronic switch (e.g., a pair of complementary metal-oxide-semiconductor (CMOS) field effect transistors configured to alternatively connect an output of the electronic switch to one of two voltage sources) coupled to the input of the transistor 370 (e.g., coupled to $V_{SELECT}$) and configured to provide a biasing voltage when the photodetector channel 310 is selected. This could include the electronic switch connecting the input of the transistor 370 to a source of a biasing voltage (e.g., a source of approximately 1 volt) when the photodetector channel 310 is selected and connecting the input of the transistor 370 to a source of a non-biasing voltage (e.g., a ground of the LIDAR system 300) when the photodetector channel 310 is not selected. The electronic switch (e.g., the CMOS pair of transistors) for a particular transistor (e.g., 370) and any coupling components (e.g., the biasing resistor 360, the Schottky diode 365) could be located proximate to the particular transistor to, e.g., reduce switching time (e.g., such that a switching time between a transistor of a first particular photodetector channel being operationally biased and a transistor of a second photodetector channel being operationally biased is less than approximately 100 nanoseconds), to reduce variability in the voltage/current applied to operationally bias the particular transistor, or according to some other consideration. The source of biasing voltage could be in-common across photodetector channels (e.g., could be approximately 1 volt for all of the photodetector channels) or could be different according to photodetector channel. In some examples, the source of biasing voltage could be adjustable, e.g., to allow setting a gain of a transistor by adjusting a voltage level of the respective biasing voltage source.

A configuration of the transistor 370 (e.g., a composition, size, geometry, level of doping, or some other property) and/or of the specified impedance 377 could be specified to set a gain, bandwidth, frequency response, offset, or other properties of the photodetector channel 310. For example, the specified impedance 377 could be a resistor having a resistance specified to set a gain of the photodetector channel 310. One or more properties of the specified impedance 377 could be specified to select a gain and bandwidth of the photodetector channel 310 that are within a constraint set by the configuration of the transistor 370 (e.g., that have a product less than the gain-bandwidth product of the transistor 370). For example, the specified impedance 377 could be configured such that the bandwidth of the photodetector channel 310 is greater than approximately 100 megahertz and/or such that the gain of the photodetector channel 310 is between approximately 200 and approximately 300. In some examples, the specified impedance 377 could be configured to maximize a gain of the photodetector channel subject to a constraint, e.g., to maximize the gain of the photodetector channel while maintaining a bandwidth of the photodetector channel 310 to be greater than approximately 100 megahertz. Of configurations and considerations related to the specified impedance 377 are anticipated.

In some examples, the specified impedance 377 could include a number of resistors, capacitors, inductors, and/or other components connected in a variety of ways. For example, FIG. 3B shows an example specified impedance 390 (e.g., components comprising in whole or in part the specified impedance 377 of FIG. 3A) comprising a resistor 391 in parallel with the series combination of a resistor 393 and an inductor 395. The components of the specified resistance (e.g., 377, 390) could be configured to provide a specified impedance spectrum, a specified impedance (e.g., a specified impedance phase and/or magnitude) at one or more frequencies, or according to some other consideration. For example, a specified impedance (e.g., 377, 390) could be configured to have an impedance of approximately 33 ohms at approximately 0 Hertz and to have an impedance of approximately 100 ohms at high frequencies (e.g., frequencies higher than approximately 1 megahertz).

The ADC 380 could include a variety of components (e.g., comparators, oscillators, pulse generators, capacitors, integrators, electronic switches, amplifiers) configured in a variety of ways to provide a variety of different types of digital outputs related to signals presented to the ADC 380. For example, the ADC could include a comparator configured to provide a high digital output when the signal provided to the ADC 380 exceeds or is below a specified level (e.g., a specified voltage). The ADC could include a direct-conversion ADC, a successive-approximation ADC, a ramp-compare ADC, a pipeline ADC, a sigma-delta ADC, or some other variety of ADC configured to produce one or more digital signals and/or values related to the value of the signal input to the ADC 380 at one or more points in time.

Note that, while shown separately in FIGS. 3A and 3B, components of a LIDAR system could be integrated into one or more integrated circuits. For example, the DAC 340, transistor 370, and/or other components (e.g., 385, 350, 360, 365, 377, a CMOS electronic switch configured to provide $V_{SELECT}$) could be integrated into a single integrated circuit that is disposed on a substrate and electrically coupled with the photodetector 330, ADC 380, and/or other components. In another example, all of the components of each photodetector channel 310 (e.g., the photodetector 330, DAC 385, transistor 370, and/or other components) could be formed in a single integrated circuit. Further, components from multiple photodetector channels (e.g., multiple photodetectors, multiple transistors, the ADC 380) could be integrated in single integrated circuit. Additionally or alternatively, one or more components of the LIDAR system 300 could be discrete components assembled on a printed circuit board or other substrate.

A LIDAR system (e.g., 300) could be used to generate information about an environment (e.g., to map the environment, to detect the location, velocity, size, geometry, or other information about objects in the environment) to enable a variety of applications. In some examples, information about an environment could be used to control an autonomous vehicle (e.g., a driverless car) such that the autonomous vehicle can navigate an environment to reach an objective (e.g., to move to a goal location) while avoiding obstacles (e.g., other vehicles). Further, note that embodiments (e.g., electronic circuitry) of the LIDAR system 300 and/or other embodiments described herein could be applied to a variety of systems or applications wherein a plurality of photodiodes or other sensor components or other signal sources are multiplexed to provide an output to a single component (e.g., a single ADC). For example, a plurality of photodetectors could be used to detect light emitted from a biological sample in response to illumination (e.g., to detect emission of light by fluorophores in a variety of non-overlapping regions of a sample environment). In another example, a plurality of photodetectors could be used for coincidence detection between a number of optical signals. Other applications are anticipated.

III. Example LIDAR System

Figure 4:
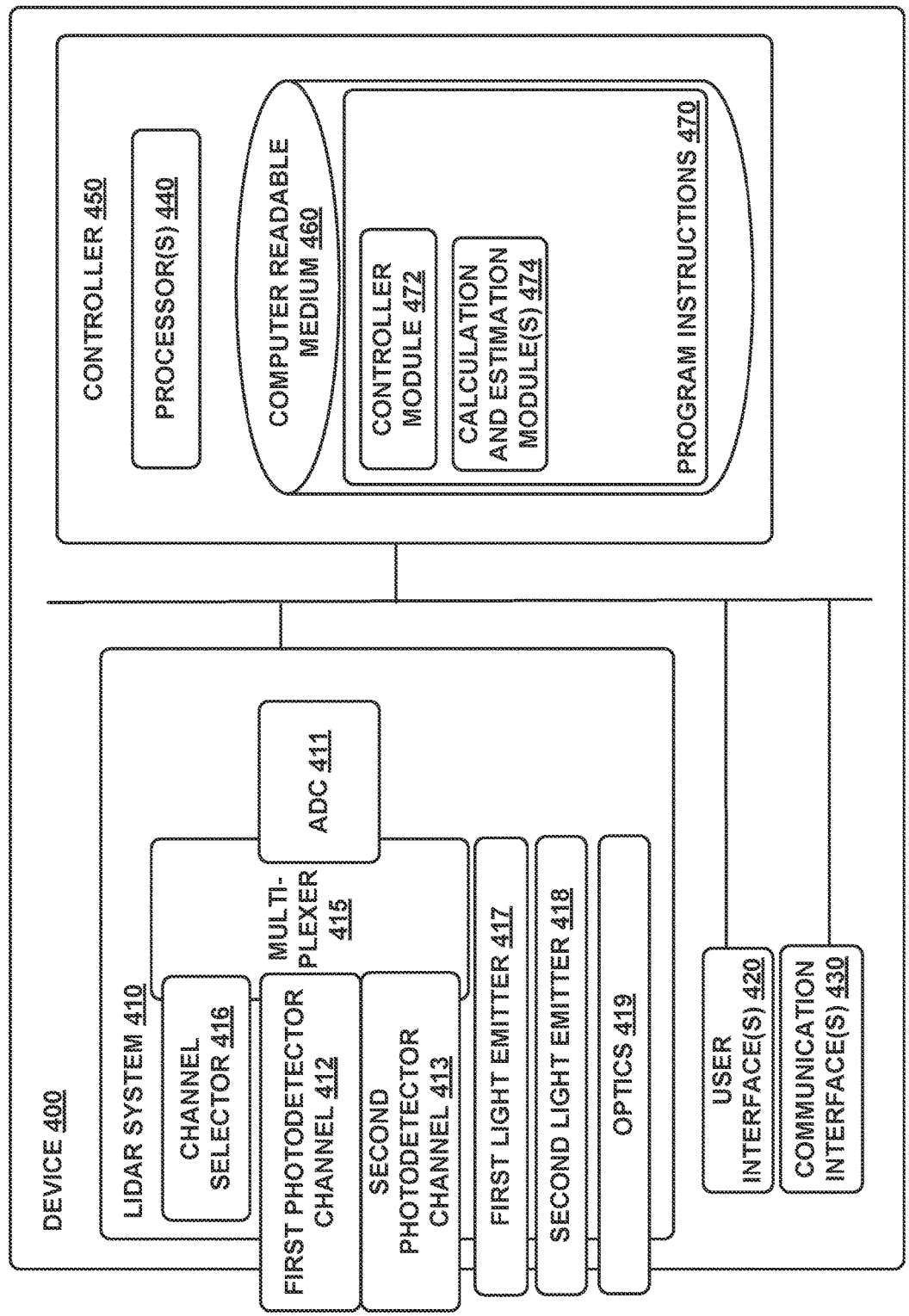
FIG. 4 is a functional block diagram of an example LIDAR system.

FIG. 4 is a simplified block diagram illustrating the components of a device 400, according to an example embodiment. Device 400 may take the form of a unit configured to be mounted to a vehicle and configured to scan the environment of the vehicle (e.g., to determine the distance between the device 400 and the environment in a plurality of directions). Device 400 may take the form of a handheld or portable unit configured to scan an environment, e.g., to scan the geometry and dimensions of a room. Device 400 may take the form of an object-scanning device configured to scan an object placed within and/or proximate to the device (e.g., by detecting the distance between the device 400 and the object in a plurality of directions and/or by rotating or otherwise moving the object). Device 400 may be part of some other system (e.g., part of an automobile) such that elements of the device 400 are distribution throughout the other system and/or are in common with elements of the other system (e.g., a controller 450 of the device 400 could additionally provide controller functions for the rest of the system). Device 400 also could take other forms.

In particular, FIG. 4 shows an example of a device 400 having a LIDAR system 410 that includes first 412 and second 413 photodetector channels, a multiplexer 415, a channel selector 416, an analog-to-digital converter (ADC) 411, first 417 and second 418 light emitters, optics 419, a user interface 420, communication interface 430 for transmitting data to a remote system, and a controller 450. Note that a LIDAR system could include more photodetector channels and/or light emitters than the two illustrated in FIG. 4. The components of the device 400 may be disposed on a mount or on some other structure for mounting the device to enable stable detection of distances to objects and/or locations in an environment of interest, mounting to an external surface of a vehicle (e.g., an autonomous automobile).

Controller 450 may be provided as a computing device that includes one or more processors 440. The one or more processors 440 can be configured to execute computer-readable program instructions 470 that are stored in the computer readable data storage 460 and that are executable to provide the functionality of a device 400 described herein.

The computer readable medium 460 may include or take the form of one or more non-transitory, computer-readable storage media that can be read or accessed by at least one processor 440. The one or more computer-readable storage media can include volatile and/or non-volatile storage components, such as optical, magnetic, organic or other memory or disc storage, which can be integrated in whole or in part with at least one of the one or more processors 440. In some embodiments, the computer readable medium 460 can be implemented using a single physical device (e.g., one optical, magnetic, organic or other memory or disc storage unit), while in other embodiments, the computer readable medium 460 can be implemented using two or more physical devices.

The light emitters 417, 418 are configured to emit light in respective directions toward an environment of the device 400 to illuminate respective objects and/or regions of the environment. The light emitters 417, 418 could include LASERs, LEDS, or other light-emitting elements. The light emitters 417, 418 could be operated to emit pulses of illumination or illumination according to some other pattern or scheme (e.g., illumination having an oscillating intensity) such that light responsively emitted from the environment (e.g., reflected by the respective objects and/or regions of the environment) can be detected by the photodetector channels 412, 413 and used to determine a distance to the respective objects/regions of the environment and/or to provide some other application.

Both photodetector channels 412, 413 include a photodiode, a coupling capacitor, an amplifying/multiplexing transistor in common with the multiplexer 415, transistor and/or photodiode biasing components, and/or other components. Each photodetector channel 412, 413 produces a respective channel output signal related to light received by the respective photodetector channel 412, 413, e.g., related to light responsively emitted from (e.g., reflected from) the environment in response to illumination by respective light emitters 417, 418.

The channel selector 416 is configured to operate the multiplexer 415 to individually select each of the photodetectors 412, 413 and to apply a signal produced by the selected photodetector channel to the ADC 411 such that the ADC 411 can detect some property of the produced signal (e.g., detect the value of the signal at one or more points in time, detect the timing of one or more peaks in the intensity of illumination received by the photodetector channels 412, 413). This could include the channel selector 416 individually selecting respective photodetector channels 412, 413 by operationally biasing the respective transistor of the respective photodetector channel.

Note that a device could include a subset of the elements illustrated here, e.g., a device could lack one or both of the light emitters 417, optics 419, user interface 420, and/or some other combination of elements. Further, a device could include multiple of one or more illustrated elements. For example, a device could include a plurality of photodetector channels configured to produce respective signals related to light received from multiple different directions and to be selected by the channel selector 416 (e.g., to be operationally biased by the channel selector 416 such that the ADC 411 can detect the signal produced by the selected photodetector channel).

The program instructions 470 stored on the computer readable medium 460 may include instructions to perform any of the methods described herein. For instance, in the illustrated embodiment, program instructions 470 include a controller module 472 and calculation and estimation module 474.

Controller module 472 may include instructions for operating the LIDAR system 410 to detect the distance to objects and/or regions of the environment of the environment of the device 400 and/or to operate according to some other application. This could include operating the light emitters 417, 418 to emit pulses of light toward the environment in respective directions during respective periods of time. Operating the LIDAR system 410 could include operating the channel selector 416 to individually select photodetector channels of the LIDAR system 410 (e.g., 412, 413) by operationally biasing respective transistors of the selected photodetector channels and/or of the multiplexer 415 such that a signal is produced by the selected photodetector channel and applied to the ADC 411. Operating the LIDAR system 410 could include operating the ADC 411 to detect one or more properties of the signal produced by the selected photodetector channel. In some examples, operating the LIDAR system 410 could include operating an actuator or other element(s) (not shown) of the LIDAR system 410 to control a direction of the light emitted from the light emitters 417, 418 and/or to control a direction from which the photodetector channels 412, 413 receive light (e.g., to 'scan' the light emitters/photodetector channels across a range of angles/areas of the environment). In some examples, operating the LIDAR system 410 could include operating a photodiode bias voltage source (e.g., a DAC of one or more of the photodetector channels 412, 413) to control a gain of the photodetector channels 412, 413, e.g., based on a detected temperature of the photodetector channels 412, 413.

Calculation and estimation module 474 may include instructions for analyzing data generated by the LIDAR system 410 to determine information (e.g., distance between the LIDAR system 410 and objects or regions of the environment) about the environment. In particular, the calculation and estimation module 474 may include instructions for determining the timing of a pulse of illumination received by one or both of the photodetector channels 412, 413 and/or for determining the time difference between such a determined pulse timing and the timing of a corresponding pulse of illumination emitted by a respective light emitter 417, 418. The calculation and estimation module 474 may additionally include instructions for determining the distance from the respective light emitter 417, 418 to an aspect of the environment (e.g., an object or region of the environment) illuminated by the respective light emitter based on the determined timing difference.

The controller module 472 can also include instructions for operating a user interface 420. For example, controller module 472 may include instructions for displaying data (e.g., pulse delay time information, distance information, environment and/or object scan data) collected by the LIDAR system 410 and analyzed by the calculation and estimation module 474. Further, controller module 472 may include instructions to execute certain functions based on inputs accepted by the user interface 420, such as inputs accepted by one or more buttons disposed on the user interface.

Communication interface 430 may also be operated by instructions within the controller module 472, such as instructions for sending and/or receiving information via a wireless antenna, a wired communications interface (e.g., Ethernet, CANbus) which may be disposed on or in the device 400. The communication interface 430 can optionally include one or more oscillators, mixers, frequency injectors, etc. to modulate and/or demodulate information on a carrier frequency to be transmitted and/or received by the antenna. Additionally or alternatively, the communication interface 430 can optionally include one or more oscillators, mixers, drivers, differential pair drivers, buffers, impedance matching components (e.g. baluns), light emitters, light detectors, or other components configured to drive one or more differential and/or single-ended wired communications interfaces and/or one or more optical (e.g., fiber-optic) communications interfaces.

The computer readable medium 460 may further contain other data or information, such as calibration data describing the gain or other properties of photodetector channels (e.g., 412, 413) of the LIDAR system 410 as functions of applied bias voltage, photodiode temperature, or other factors. The calculation and estimation module 474 may include instructions for generating such calibration data and/or other data describing the operation of the device 400 (e.g., relationships between distances to objects or regions of an environment and detected time differences between emitted light pulses and detected reflected light pulses) based on data collected during operation of the device 400. Such calibration data may also be generated and/or stored by a remote server and transmitted to the device 400 via communication interface 430. Such calibration data could be generated by some external system, e.g., a device configured to determine photodetector channel gain characteristics when the device 400 is manufactured.

IV. Illustrative Methods for Operating a LIDAR

Figure 5:
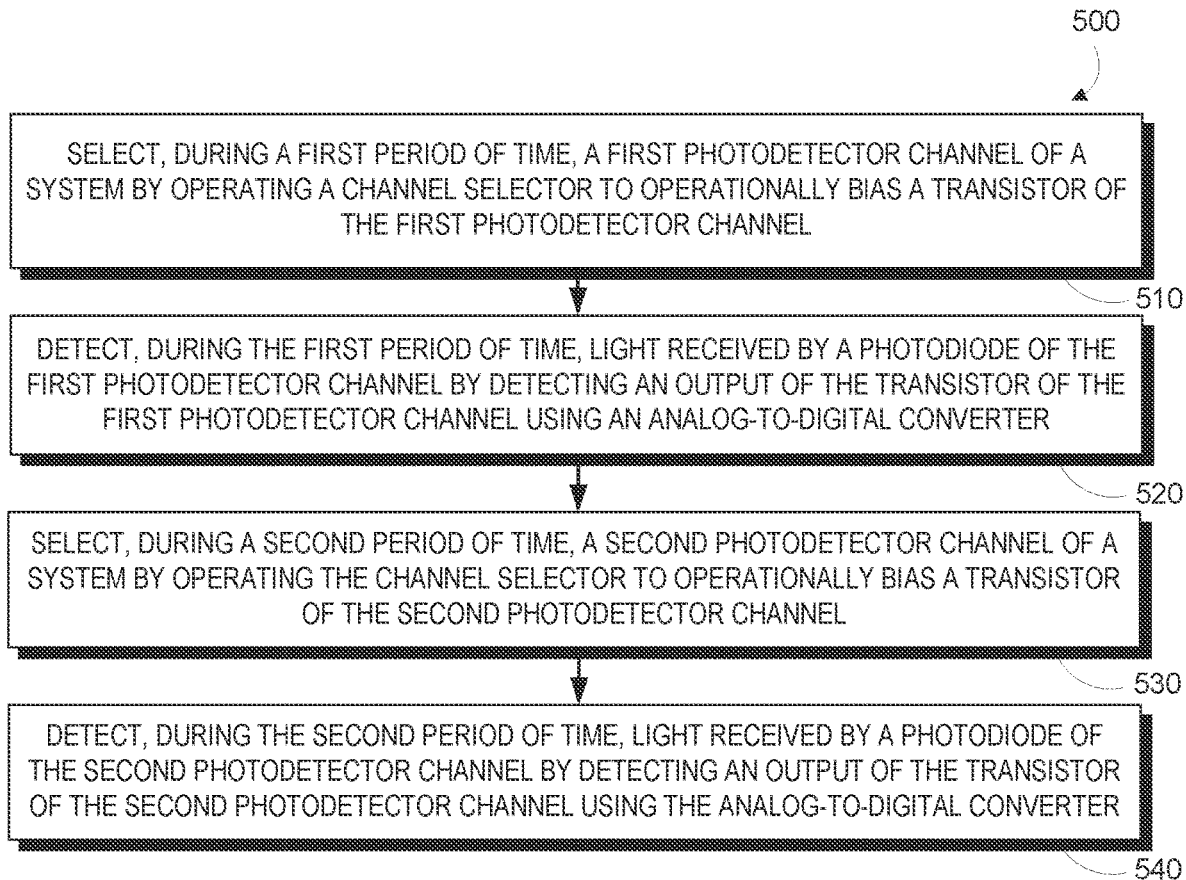
FIG. 5 is a flowchart of an example method.

FIG. 5 is a flowchart of a method 500 for operating a LIDAR system. The LIDAR system includes an (i) analog-to-digital converter (ADC), (ii) at least one photodiode biasing voltage source, (iii) a channel selector, and (iv) a plurality of photodetector channels. Each photodetector channel includes (a) a photodiode coupled to the at least one photodiode biasing voltage source and configured to provide a photodiode signal indicative of light incident on the photodiode when the photodiode is reverse-biased, (b) a capacitor coupled to the photodiode, (c) a transistor having an input coupled to the photodiode via the capacitor, having an output coupled to the ADC, and configured to amplify the photodiode signal to provide an amplified photodiode signal to the ADC when the transistor is operationally biased by the channel selector. The channel selector is configured to individually select each respective photodetector channel in the plurality of photodetector channels by operationally biasing the respective transistor of selected individual photodetector channels.

The method 500 includes selecting, during a first period of time, a first photodetector channel of the LIDAR system (510). This includes operating the channel selector to operationally bias a transistor of the selected first photodetector channel. The method 500 also includes, during the first period of time, detecting light received by the first photodetector channel by detecting an output of the first photodetector channel using the ADC of the LIDAR system (520). This could include operating the ADC to detect values of the output of the transistor of the selected first photodetector channel at a plurality of points in time (e.g., to sample the output at a specified rate).

The method 500 includes selecting, during a second period of time, a second photodetector channel of the LIDAR system (530). This includes operating the channel selector to operationally bias a transistor of the selected second photodetector channel. The method 500 also includes, during the second period of time, detecting light received by the second photodetector channel by detecting an output of the second photodetector channel using the ADC of the LIDAR system (540). This could include operating the ADC to detect values of the output of the transistor of the selected second photodetector channel at a plurality of points in time (e.g., to sample the output at a specified rate).

The method 500 for operating a LIDAR system could include additional steps. In some examples, the method 500 could include illuminating the environment of the LIDAR system with a pulse of illumination (e.g., by operating a light emitter of the LIDAR system), and the first or second photodetectors could be configured to detect a responsively emitted (e.g., reflected) pulse of illumination from the environment during the first or second period of time, respectively. The method 500 could additionally include determining a distance from such a light emitter to an illuminated aspect of the environment, e.g., based on a time difference between the emitted pulse of illumination and a corresponding detected pulse of light (detected, e.g., by the first or second photodetector channels). The method 500 could include operating additional photodetector channels during respective additional respective periods of time and/or operating the first and second photodetectors during respective additional periods of time. The method 500 could include adjusting a bias voltage applied to a photodiode, transistor, or other element of the photodetector channels (e.g., using a DAC of the LIDAR system) to control a gain of the photodetector channel based on, e.g., a detected temperature of a photodiode or other elements of the photodetector channels.

The example method 500 illustrated in FIG. 5 is meant as an illustrative, non-limiting example. Additional or alternative elements of the method and additional or alternative components of the LIDAR system are anticipated, as will be obvious to one skilled in the art.

V. Conclusion

The particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

Additionally, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

What is claimed is:

1. A system comprising:
    a photodetector, wherein the photodetector is configured to provide a photodetector signal;
    an amplifier connected to the photodetector, wherein, in response to receiving a bias signal, the amplifier is configured to amplify the photodetector signal;
    a channel selector, wherein the channel selector is configured to provide the bias signal to the amplifier; and
    a diode and a resistor coupled in parallel between an input of the amplifier and the channel selector.

2. The system of claim 1, wherein the amplifier comprises a capacitor and a transistor, and wherein the transistor is a bipolar transistor or a silicon-germanium transistor.

3. The system of claim 2, further comprising an analog-to-digital converter coupled to an output of the transistor.

4. The system of claim 1, wherein a cathode of the diode is coupled to the channel selector, and wherein the channel selector is configured to provide the bias signal to the amplifier via the diode and the resistor.

5. The system of claim 1, further comprising at least one photodetector biasing voltage source configured to reverse bias the photodetector.

6. The system of claim 5, wherein the at least one photodetector biasing voltage source provides a voltage between approximately 150 volts and approximately 250 volts.

7. The system of claim 5, wherein the voltage provided by the at least one photodetector biasing voltage source is controllable.

8. The system of claim 5, further comprising a digital-to-analog converter coupled to the photodetector via an additional resistor, wherein the digital-to-analog converter is configured to adjust a reverse-bias voltage applied to the photodetector by the at least one photodetector biasing voltage source.

9. The system of claim 1, further comprising a temperature sensor configured to detect a temperature of the photodetector.

10. The system of claim 1, wherein the photodetector comprises a photodiode.

11. The system of claim 1, wherein the channel selector comprises a plurality of electronic switches, wherein at least one of the electronic switches of the channel selector is coupled to the input of the amplifier via the resistor, and wherein the channel selector providing the bias signal to the amplifier comprises the channel selector operating the at least one electronic switch.

12. A method comprising:
    providing, by a photodetector, a photodetector signal;
    providing, by a channel selector, a bias signal to an amplifier, wherein the amplifier is connected to the photodetector, and wherein a diode and a resistor are coupled in parallel between an input of the amplifier and the channel selector; and amplifying, by the amplifier in response to receiving the bias signal, the photodetector signal.

13. The method of claim 12, wherein the amplifier comprises a capacitor and a transistor, and wherein the transistor is a bipolar transistor or a silicon-germanium transistor.

14. The method of claim 12, wherein providing the bias signal to the amplifier comprises providing the bias signal to the amplifier via the diode and the resistor, and wherein a cathode of the diode is coupled to the channel selector.

15. The method of claim 12, further comprising reverse biasing, by at least one photodetector biasing voltage source, the photodetector.

16. The method of claim 15, wherein reverse biasing the photodetector comprises providing, by the at least one photodetector biasing voltage source, a voltage between approximately 150 volts and 250 volts.

17. The method of claim 15, further comprising adjusting, by a digital-to-analog converter coupled to the photodetector via an additional resistor, a reverse-bias voltage applied to the photodetector by the at least one photodetector biasing voltage source.

18. The method of claim 12, further comprising detecting, by a temperature sensor, a temperature of the photodetector.

19. The method of claim 12, wherein the photodetector comprises a photodiode.

20. The method of claim 12, wherein the channel selector comprises a plurality of electronic switches, wherein at least one of the electronic switches of the channel selector is coupled to the input of the amplifier via the resistor, and wherein the channel selector providing the bias signal to the amplifier comprises the channel selector operating the at least one electronic switch.

* * * * *